United States Patent
Watanabe

(10) Patent No.: US 10,836,843 B2
(45) Date of Patent: Nov. 17, 2020

(54) MODIFIED VINYL ALCOHOL-BASED POLYMER, AND DISPERSION STABILIZER FOR SUSPENSION POLYMERIZATION

(71) Applicant: DENKA COMPANY LIMITED, Tokyo (JP)

(72) Inventor: Wataru Watanabe, Niigata (JP)

(73) Assignee: DENKA COMPANY LIMITED, Tokyo (JP)

( * ) Notice: Subject to any disclaimer, the term of this patent is extended or adjusted under 35 U.S.C. 154(b) by 6 days.

(21) Appl. No.: 16/320,032

(22) PCT Filed: Aug. 22, 2017

(86) PCT No.: PCT/JP2017/029975
§ 371 (c)(1),
(2) Date: Jan. 23, 2019

(87) PCT Pub. No.: WO2018/038112
PCT Pub. Date: Mar. 1, 2018

(65) Prior Publication Data
US 2019/0241682 A1    Aug. 8, 2019

(30) Foreign Application Priority Data
Aug. 25, 2016 (JP) ................. 2016-164943

(51) Int. Cl.
*C08F 2/20* (2006.01)
*C08F 290/06* (2006.01)
*C08F 218/08* (2006.01)
*C08G 65/08* (2006.01)
*C08G 65/16* (2006.01)
*C08F 8/12* (2006.01)
*C08F 218/06* (2006.01)

(52) U.S. Cl.
CPC ............ *C08F 2/20* (2013.01); *C08F 8/12* (2013.01); *C08F 218/06* (2013.01); *C08F 218/08* (2013.01); *C08F 290/06* (2013.01); *C08G 65/08* (2013.01); *C08G 65/16* (2013.01)

(58) Field of Classification Search
CPC .. C08F 2/20; C08F 290/06; C08F 8/12; C08F 218/08; C08G 65/08; C08G 65/16
See application file for complete search history.

(56) References Cited

U.S. PATENT DOCUMENTS

2015/0191558 A1* 7/2015 Fukuhara ............ C08F 2/20
525/57

FOREIGN PATENT DOCUMENTS

| EP | 2735577 A1 | 5/2014 |
|---|---|---|
| JP | 1997100301 A | 4/1997 |
| JP | 1998147604 A | 6/1998 |
| JP | 1998259213 A | 9/1998 |
| JP | 1999217413 A | 8/1999 |
| JP | 2001040019 A | 2/2001 |
| JP | 2002069105 A | 3/2002 |
| JP | 2004075870 A | 3/2004 |
| JP | 2008138014 A | 6/2008 |
| JP | 2011074096 A | 4/2011 |
| JP | 2011126931 A | 6/2011 |
| WO | 2010113569 A1 | 10/2010 |
| WO | 2013115239 A1 | 8/2013 |

OTHER PUBLICATIONS

English Abstract for JP 1997100301 A (1997).
English Abstract for JP 1998147604 A (1998).
English Abstract for JP 1998259213 A (1998).
English Abstract for JP 1999217413 A (1999).
English Abstract for JP 2001040019 A (2001).
English Abstract for JP 2002069105 A (2002).
English Abstract for JP 2004075870 A (2004).
English Abstract for JP 2008138014 A (2008).
English Abstract for JP 2011074096 A (2011).
English Abstract for JP 2011126931 A (2011).
Extended European Search Report of corresponding European Application No. 17843590.5 dated Apr. 8, 2020.

* cited by examiner

*Primary Examiner* — Robert D Harlan
(74) *Attorney, Agent, or Firm* — Caesar Rivise, PC

(57) ABSTRACT

An object of the present invention is to provide a dispersion stabilizer for suspension polymerization which satisfies various performance requirements for suspension polymerization of a vinyl-based compound such as vinyl chloride. The present invention relates a modified vinyl alcohol-based polymer having at least one monomer unit represented by a following general formula (I) and a modification rate of from 0.01 mol % to 10 mol %:

general formula (1)

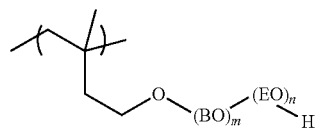

in which BO represents an oxybutylene unit; EO represents an oxyethylene unit; and each of m and n is a number of repeating unit of the respective oxyalkylene units; $1 \leq m \leq 10$; and $1 \leq n \leq 60$.

7 Claims, No Drawings

MODIFIED VINYL ALCOHOL-BASED POLYMER, AND DISPERSION STABILIZER FOR SUSPENSION POLYMERIZATION

CROSS-REFERENCE TO RELATED APPLICATIONS

This application is the U.S. National Phase Application of PCT/JP2017/029975, filed Aug. 22, 2017, which claims priority from JP 2016-164943, filed Aug. 25, 2016, the contents of which applications are incorporated herein by reference in their entireties for all purposes.

TECHNICAL FIELD

The present invention relates to a modified vinyl alcohol-based polymer having a polyoxyalkylene group. The present invention also relates to a dispersion stabilizer for suspension polymerization, which is especially suitable for suspension polymerization of a vinyl compound, particularly vinyl chloride.

BACKGROUND ART

For suspension polymerization of a vinyl chloride monomer or a mixture of a vinyl chloride monomer and a monomer that is copolymerizable with the vinyl chloride monomer, various dispersion stabilizers are essentially used. As the dispersion stabilizers, polyvinyl alcohol, methylol cellulose, vinyl acetate/maleic anhydride copolymers, gelatin, and the like are used. Among these, polyvinyl alcohol (PVA) has excellent properties and is most commonly used. For example, prior arts propose a method of using a modified PVA having a low polymerization degree, a low saponification degree and an oxyalkylene group(s) in a side chain, as a dispersion stabilizer for suspension polymerization of a vinyl-based compound (see Patent Documents 1 to 8).

CITATION LIST

Patent Literatures

Patent Document 1: Japanese Patent Application Publication No. H09-100301 A
Patent Document 2: Japanese Patent Application Publication No. H10-147604 A
Patent Document 3: Japanese Patent Application Publication No. H10-259213 A
Patent Document 4: Japanese Patent Application Publication No. H11-217413 A
Patent Document 5: Japanese Patent Application Publication No. 2001-040019 A
Patent Document 6: Japanese Patent Application Publication No. 2002-069105 A
Patent Document 7: Japanese Patent Application Publication No. 2004-075870 A
Patent Document 8: WO 2013/115239 A1

SUMMARY OF INVENTION

Technical Problem

However, the dispersion stabilizers described in Patent Documents 1 to 8 have not necessarily achieved satisfactory performance, specifically relating to: (1) a small amount of coarse particles exist in resin particles; (2) the obtained resin particles are uniform in particle diameter as much as possible and deposition of scales can be prevented; (3) a resin having high porosity can be obtained even when used in a small amount, resulting in ease of removal of monomer components and a resin with high absorbability of a plasticizer; (4) foaming during polymerization is suppressed, and the like.

Thus, an object of the present invention is to provide a dispersion stabilizer for suspension polymerization which satisfies the above performance requirements (1) to (4) when suspension-polymerizing a vinyl-based compound such as vinyl chloride.

Solution to Problem

As a result of extensive studies to solve the above problems, the present inventors have found that it is effective to use a modified vinyl alcohol-based polymer which has a polyoxyalkylene group including at least one oxybutylene unit and at least one oxyethylene unit (hereinafter referred to as "modified group") in its side chain, and which has a modification rate of from 0.01 mol % to 10 mol %, as a dispersion stabilizer for suspension polymerization of a vinyl-based compound.

Thus, in one aspect, the present invention relates a modified vinyl alcohol-based polymer having at least one monomer unit represented by the following general formula (I) and a modification rate of from 0.01 mol % to 10 mol %:

general formula (1)

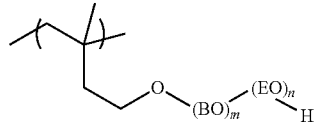

in which BO represents an oxybutylene unit; EO represents an oxyethylene unit; and each of m and n is a number of repeating unit of the respective oxyalkylene units; $1 \leq m \leq 10$; and $1 \leq n \leq 60$.

In one embodiment, the modified vinyl alcohol-based polymer according to the present invention has a viscosity average polymerization degree of from 300 to 5000.

In another embodiment, the modified vinyl alcohol-based polymer according to the present invention has a saponification degree of from 60 mol % to 99.9 mol %.

In yet another embodiment, the modified vinyl alcohol-based polymer according to the present invention has a viscosity average polymerization degree of 1000 or less.

In yet another embodiment, the modified vinyl alcohol-based polymer according to the present invention has a saponification degree of from 65 mol % to 80 mol %.

In another aspect, the present invention relates to a dispersion stabilizer for suspension polymerization, comprising the modified vinyl alcohol-based polymer according to the present invention.

In another aspect, the present invention relates to a method for producing a vinyl resin, comprising: dispersing a vinyl-based compound monomer or a mixture of the vinyl-based compound monomer and a monomer that is copolymerizable with the vinyl compound monomer in water with the dispersion stabilizer for suspension polymerization according to the present invention, and carrying out suspension polymerization.

Advantageous Effects of Invention

When suspension polymerization of a vinyl-based compound is carried out using the dispersion stabilizer for suspension polymerization according to the present invention, resin particles with less coarse particles and high uniformity of particle diameters can be obtained. Furthermore, because of less formation of coarse particles, block formation during polymerization is suppressed and particles with high uniformity of particle diameters are obtained, so that deposition of scales is reduced. Polymer particles having high porosity can be obtained, so that foaming is less, and plasticizer absorption properties and monomer removal properties are improved. As described above, the dispersion stabilizer for suspension polymerization according to the present invention can exhibit the performance requirements which were difficult to be achieved by the prior arts.

DESCRIPTION OF THE PREFERRED EMBODIMENTS

A dispersion stabilizer for suspension polymerization according to the present invention contains a modified vinyl alcohol-based polymer (modified PVA) having at least one monomer unit represented by the following general formula (I):

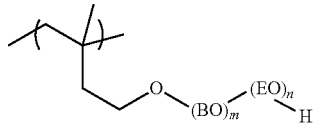

General formula (I)

in which BO represents an oxybutylene unit ($-CH_2 CH(CH_2 CH_3)O-$); EO represents an oxyethylene unit ($-CH_2 CH_2 O-$); and each of m and n is a number of repeating unit of the respective oxyalkylene units; $1 \leq m \leq 10$; and $1 \leq n \leq 60$.

The m is preferably 3 or more, and more preferably 5 or more. Further, the m is preferably 9 or less, and more preferably 8 or less.

The n is preferably 20 or more, and more preferably 30 or more, and even more preferably 40 or more. Further, the n is preferably 55 or less, and more preferably 50 or less.

It is important for the modified PVA to have a modification rate of from 0.01 mol % or more and 10 mol % or less. If the modification rate is more than 10 mol %, the proportion of hydrophobic groups contained per molecule of the modified PVA will be increased and a water solubility of the modified PVA will be decreased, so that it is difficult to use the modified PVA as a dispersion stabilizer for suspension polymerization. Therefore, it is important to have the modification rate of 10 mol % or less, and preferably 5 mol % or less, and more preferably 2 mol % or less, and still more preferably 1 mol % or less. On the other hand, if the modification rate is less than 0.01 mol %, the water solubility is good, but the number of modified groups contained in the modified PVA is decreased, so that the required physical properties are not sufficiently achieved. Therefore, it is important to have the modification rate of 0.01 mol % or more, and preferably 0.05 mol % or more, and more preferably 0.1 mol % or more.

The modification rate refers to a ratio (mol %) of a number of moles of the monomer unit represented by the general formula (I) to a number of moles of all the monomer units configuring the modified PVA. The modification rate can be determined by proton NMR. Specifically, the modified PVA is saponified to a saponification degree of 99.95 mol % or more, and then sufficiently washed with methanol to prepare a modified PVA for analysis. The prepared modified PVA for analysis is dissolved in heavy water, and several drops of a solution of NaOH in heavy water are added, and pH is adjusted to 14, and the modified PVA was then measure at 80° C. with proton NMR. The content was calculated from an integral value of peaks of from 1.2 to 1.8 ppm belonging to the methylene group in the main chain of the modified PVA and an integral value of peaks of from 0.8 to 1.0 ppm belonging to the methyl group in the oxybutylene unit represented by the general formula (I), in accordance with the conventional methods. Specifically, in view of the number of protons (a methylene group has 2Hs, a methyl group has 3Hs), the modification rate is calculated as {a/(3×m)}/(b/2)×100, in which b is the integral value of the methylene group in the main chain of the modified PVA and a is the integral value of the methyl group in the oxybutylene unit. For example, when a=1, m=1 and b=100, it is calculated as 0.67 mol %.

The viscosity average polymerization degree of the modified PVA is preferably 300 or more, and more preferably 400 or more, and still more preferably 500 or more, in order to improve a dispersion stability in suspension polymerization of a vinyl-based compound. Further, the viscosity average polymerization degree of the modified PVA is preferably 5000 or less, and more preferably 4000 or less, and more preferably 3000 or less, and still more preferably 1500 or less, and even more preferably 1000 or less, in order to prevent the viscosity of the aqueous solution from being increased to make handling difficult.

The viscosity average polymerization degree is measured in accordance with JIS K 6726: 1994. That is, after completely saponifying and purifying the modified PVA, the viscosity average polymerization degree is determined from limiting viscosity number [η] measured in water at 30° C.

The saponification degree of the modified PVA is preferably 60 mol % or more, and more preferably 65 mol % or more, and still more preferably 70 mol % or more, in order to increase water solubility to make handling easier. Further, the saponification degree of the modified PVA is preferably 99.9 mol % or less, and more preferably 90 mol % or less, and still more preferably 80 mol % or less, in order to increase the porosity of particles obtained by suspension polymerization of a vinyl-based compound to improve absorbability of a plasticizer.

The saponification degree of the modified PVA is measured in accordance with JIS K 6726: 1994. That is, it can be determined by quantifying a residual acetate group (mol %) in a sample with sodium hydroxide and subtracting it from 100.

A method for producing the modified PVA according to the present invention is not particularly limited. According to a simple and preferable method, an unsaturated monomer represented by the following general formula (II), which is an unsaturated monomer for deriving the modified structure represented by the general formula (I), is copolymerized with a vinyl ester-based monomer represented by vinyl acetate, and the resulting modified vinyl ester-based polymer is saponified. The vinyl ester-based monomer includes, in addition to vinyl acetate, vinyl formate, vinyl propionate, vinyl valerate, vinyl caprate, vinyl laurate, vinyl stearate, vinyl benzoate, vinyl pivalate, vinyl versatate, and the like.

General formula (II)

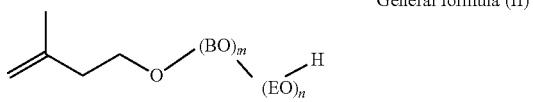

in which BO represents an oxybutylene unit (—CH$_2$ CH(CH$_2$ CH$_3$)O—); EO represents an oxyethylene unit (—CH$_2$ CH$_2$ O—); and each of m and n is a number of repeating unit of the respective oxyalkylene units; 1≤m≤10; and 1≤n≤60.

A method for polymerization includes, but not particularly limited to, any known methods such as solution polymerization, emulsification polymerization, suspension polymerization, bulk polymerization and the like. In view of a saponification reaction as described below, solution polymerization using an alcohol such as methanol, ethanol, isopropyl alcohol or the like as a solvent is preferable. In order to improve the reaction rate with the vinyl ester-based monomer, each monomer component can be charged using any means such as fractional charging such as continuous addition of the vinyl ester-based monomer and/or the comonomer, or collective charging. A polymerization initiator used for the solution polymerization includes, but not particularly limited to, azo compounds such as azobisisobutyronitrile, azobis-2,4-dimethylvaleronitrile, azobis(4-methoxy-2,4-dimethylvaleronitrile), azobisdimethylvaleronitrile and azobismethoxyvaleronitrile; peroxides such as acetyl peroxide, benzoyl peroxide, lauroyl peroxide, acetylcyclohexylsulfonyl peroxide, and 2,4,4-trimethylpentyl-2-peroxyphenoxyacetate; percarbonate compounds such as diisopropyl peroxydicarbonate, di-2-ethylhexyl peroxydicarbonate, and diethoxyethyl peroxydicarbonate; and perester compounds such as t-butyl peroxyneodecanate, α-cumyl peroxyneodecanate, and t-butyl peroxyneodecanate, which may be used alone or in combination. Further, a temperature of the polymerization reaction is not particularly limited, but it can usually be set within a range of about 30 to 90° C. In terms of ease of operation and control of polymerization, it is recommended that the polymerization be carried out around a boiling point of the solvent to be used.

When the unsaturated monomer represented by the general formula (II) is copolymerized with the vinyl ester-based monomer at an elevated temperature, coloring of PVA or the like due to decomposition of the vinyl ester-based monomer may be seen. In such a case, to prevent the coloring, an antioxidant such as citric acid may be added in an amount of 1 ppm or more and 100 ppm or less (relative to the weight of the vinyl ester-based monomer) to the polymerization system.

If necessary, the vinyl ester-based monomer may be copolymerized with monomers that are copolymerizable with the vinyl ester-based monomer, for example, unsaturated monocarboxylic acids such as acrylic acid, methacrylic acid and crotonic acid or alkyl esters of these unsaturated monocarboxylic acids; unsaturated dicarboxylic acids such as maleic acid, fumaric acid and itaconic acid or alkyl esters of these unsaturated dicarboxylic acids; nitriles or amides such as acrylonitrile, methacrylonitrile, acrylamide and methacrylamide; olefin sulfonic acids such as ethylene sulfonic acid, allyl sulfonic acid, and methallyl sulfonic acid or salts thereof; vinyl ethers; vinyl ketones; α-olefins; vinyl halides; vinylidene halides; and the like, alone or in combination. A suitable mixing ratio of such monomers is 10 mol % or less, and preferably 5 mol % or less, in total, based on the total number of moles of the vinyl ester-based monomer and the unsaturated monomer represented by the formula (II).

Further, upon copolymerization of the unsaturated monomer represented by the general formula (II) and the vinyl ester-based monomer, the copolymerization may be carried out in the presence of a chain transfer agent within a scope that does not divert from the spirit of the present invention, for the purpose of controlling the polymerization degree of the resulting modified vinyl ester-based polymer. Examples of the chain transfer agent include aldehydes such as acetaldehyde and propionaldehyde; ketones such as acetone and methyl ethyl ketone; mercaptans such as 2-hydroxyethanethiol; halogenated hydrocarbons such as trichlorethylene and perchlorethylene; phosphinate salts such as sodium phosphinate monohydrate. Among them, the aldehydes and ketones are preferably used. An addition amount of the chain transfer agent may be determined according to a chain transfer constant of the chain transfer agent added and the targeted polymerization degree of the modified vinyl ester-based polymer. In general, the addition amount of the chain transfer agent is preferably 0.1% by mass or more and 10% by mass or less relative to the vinyl ester-based monomer.

The saponification method in production of the modified PVA is also not particularly limited, and it is preferable to saponify the polymer obtained by the above method, using the alcohols also used as a solvent, according to the conventional methods. The alcohols include methanol, ethanol, butanol and the like. The concentration of the polymer in the alcohol can be selected from the range of from 20 to 50% by mass. An alkali catalyst can be used, such as hydroxides and alcoholates of alkali metals, such as sodium hydroxide, potassium hydroxide, sodium methylate, sodium ethylate and potassium methylate, and an acid catalyst can be used, such as aqueous solutions of inorganic acids such as hydrochloric acid and sulfuric acid, and organic acids such as p-toluenesulfonic acid. An amount of these catalysts used is required to be from 1 to 100 mmolar equivalent relative to the vinyl ester-based monomer. In such a case, the saponification temperature is not particularly limited, but it is usually in a range of from 10 to 70° C., and preferably from 30 to 50° C. The reaction is usually carried out for 1 to 3 hours.

The dispersion stabilizer for suspension polymerization according to the present invention may contain PVA other than the above modified PVA or other various additives, within a scope that does not divert from the spirit of the present invention. Examples of the additives include polymerization regulators such as aldehydes, halogenated hydrocarbons and mercaptans; polymerization inhibitors such as phenol compounds, sulfur compounds, and N-oxide compounds; pH adjusting agents; crosslinking agents; preservatives; antifungal agents; antiblocking agents; defoaming agents and the like. In terms of significantly exhibiting the effect of the present invention, the dispersion stabilizer for suspension polymerization according to the present invention preferably contains 10% by mass or more, and more preferably 30% by mass or more, and still more preferably 70% by mass or more, of the modified PVA.

The dispersion stabilizer for suspension polymerization according to the present invention can be suitably used particularly for suspension polymerization of a vinyl-based compound. Examples of the vinyl-based compound include vinyl halides such as vinyl chloride; vinyl esters such as vinyl acetate and vinyl propionate; acrylic acid, methacrylic acid, esters and salts thereof; maleic acid, fumaric acid, esters and anhydrides thereof; styrene, acrylonitrile, vinylidene chloride, vinyl ether and the like. Among these, the dispersion stabilizer for suspension polymerization according to the present invention is particularly suitably used in suspension polymerization of vinyl chloride alone or in combination with a comonomer(s) that is/are copolymerizable with vinyl chloride. Examples of the monomer that is copolymerizable with vinyl chloride include vinyl esters such as vinyl acetate and vinyl propionate; (meth)acrylates such as methyl (meth)acrylate and ethyl (meth)acrylate; α-olefins such as ethylene and propylene; unsaturated dicarboxylic acids such as maleic anhydride and itaconic acid; acrylonitrile, styrene, vinylidene chloride, vinyl ether and the like.

The dispersion stabilizer for suspension polymerization according to the present invention is suitable for producing a soft vinyl chloride resin in terms of producing vinyl chloride resin particles having excellent absorbability of a plasticizer. It also can be used for production of a hard vinyl chloride resin in terms of excellent monomer removal property, particle size distribution and the like.

The dispersion stabilizer for suspension polymerization according to the present invention can be used alone or in combination with other stabilizers such as cellulose derivatives, surfactants and the like.

By using the dispersion stabilizer for suspension polymerization according to the present invention, it is possible to always obtain a vinyl chloride resin having very good physical properties such as porous resin particles, a uniform particle size distribution and few fish eyes. Hereinafter, the method for polymerizing the vinyl-based compound will be specifically described by way of examples, but the invention is not limited thereto.

For production of resin particles of the vinyl-based compound such as vinyl chloride resin particles, the dispersion stabilizer for suspension polymerization described above is added in an amount of from 0.01% by mass to 0.3% by mass, and preferably from 0.04% by mass to 0.15% by mass, to the vinyl-based compound monomer. Further, a mass ratio of the vinyl-based compound to water can be vinyl-based compound:water=1:0.9 to 1:3, preferably vinyl-based compound:water=1:1 to 1:1.5.

The polymerization initiator may be one conventionally used for the polymerization of vinyl-based compounds, including percarbonate compounds such as diisopropyl peroxydicarbonate, di-2-ethylhexyl peroxydicarbonate, and diethoxyethyl peroxydicarbonate; perester compounds such as t-butyl peroxyneodecanoate, α-cumyl peroxyneodecanoate and t-butyl peroxyneodecanoate; peroxides such as acetylcyclohexylsulfonyl peroxide and 2,4,4-trimethylpentyl-2-peroxyphenoxyacetate; azo compounds such as azobis-2,4-dimethylvaleronitrile, and azobis(4-methoxy-2,4-dimethylvaleronitrile); and further potassium sulfate, ammonium persulfate, hydrogen peroxide and the like, which may be used alone or in combination.

Furthermore, a polymerization regulator, a chain transfer agent, a gelation improving agent, an antistatic agent, a pH adjusting agent and the like, which are appropriately used for polymerization of the vinyl-based compound, may be optionally added.

A charging ratio of each component, and a polymerization temperature and the like when carrying out the polymerization of the vinyl-based compound are not particularly limited, and they may be determined in accordance with the conventional conditions in the suspension polymerization of the vinyl-based compound.

EXAMPLES

Hereinafter, the present invention will be described in more detail with reference to Examples. As used herein, "part(s)" and "%" mean "part(s) by mass" and "% by mass", unless otherwise specified.

Example 1

<Production of Dispersion Stabilizer>

To a polymerization vessel were added 825 g of vinyl acetate, 923 g of methanol, and 35.3 g of a polyoxyalkylene alkenyl ether (LATEMUL PD-450 provided by Kao Corporation; hereinafter referred to as "monomer A") represented by the general formula (II) with m=5 to 9 and n=45 to 55, as a modified species, and the system was purged with nitrogen for 30 minutes. The number of repeating unit of the monomer A, m=5 to 9, and n=45 to 55, was confirmed by the manufacturer and by NMR. Further, the monomer A was dissolved in a mixed solution of methanol and vinyl acetate (methanol:vinyl acetate=42:58 (mass ratio)) to prepare a comonomer solution having a concentration of the monomer A of 13% by mass, and nitrogen purge was carried out by nitrogen gas bubbling. 2.5 g of azobisisobutyronitrile was charged into the polymerization vessel and the comonomer solution was dropped to carry out polymerization at 60° C. for 9 hours, followed by cooling to terminate the polymerization. The total addition amount of vinyl acetate was 1500 g, the total addition amount of methanol was 1440 g, and the total addition amount of monomer A was 141 g, until the polymerization was terminated. Unreacted vinyl acetate was then removed by conventional methods, and the resulting polymer was saponified with sodium hydroxide by conventional methods to prepare a dispersion stabilizer. A viscosity average polymerization degree, saponification degree and modification rate of the resulting dispersion stabilizer were measured by the analysis method as described above, indicating that the viscosity average polymerization degree was 520, the saponification degree was 74.2 mol % and the modification rate was 0.16 mol %.

<Suspension Polymerization of Vinyl Chloride>

To a 30 L stainless steel autoclave equipped with a stirrer were added 12 kg of water at 30° C. with stirring, 9.5 g of the resulting dispersion stabilizer and 4.6 g of t-butyl peroxyneodecanoate as a polymerization initiator, and 1 g of α-cumyl peroxyneodecanoate. After degassing the autoclave under vacuum, 5 kg of vinyl chloride monomer was added, and polymerization was carried out at 57° C. for 4 hours.

<Evaluation of Vinyl Chloride Resin>

An average particle diameter, particle size distribution, plasticizer absorption amount and bulk specific gravity of the resulting vinyl chloride resin were evaluated. The measurement of the average particle diameter was carried out according to JIS Z 8815: 1994 using sieves of 60 mesh (mesh opening of 250 μm), 80 mesh (mesh opening of 180 μm), 100 mesh (mesh opening of 150 μm), 150 mesh (mesh opening of 106 μm), and 200 mesh (mesh opening of 75 μm). A particle diameter (D50) having a cumulative frequency of 50% was determined to be the average particle diameter, and a difference between a particle diameter (D80) having a cumulative frequency of 80% and a particle diameter (D20) having a cumulative frequency of 20% was determined to be the particle size distribution.

The bulk specific gravity was measured in accordance with JIS K 6720-2: 1999.

The plasticizer absorption amount was measured by the following procedure. A glass fiber was filled over a bottom of an aluminum alloy container having an inner diameter of 25 mm and a depth of 85 mm, and 10 g of vinyl chloride resin was charged therein. To the container was added 15 ml of a plasticizer (dioctyl phthalate; hereinafter referred to as DOP) and allowed to stand for 30 minutes to permeate the DOP into the vinyl chloride resin sufficiently. Excessive DOP was centrifuged under an acceleration of 1500 G, and a mass of DOP absorbed in 10 g of the vinyl chloride resin was measured and converted into DOP parts by mass per 100 parts by mass of the vinyl chloride resin (phr).

<Evaluation of Foaming of Polymer Solution>

600 mL of the solution after the end of the polymerization was added to a 2 L cylinder, and the temperature was adjusted to 25° C., and the mixture was then stirred at 1600 rpm for 180 seconds with chemistirrer. A height of foaming relative to a height before stirring was then measured over time and evaluated according to the following criteria:
A: Foaming quickly fell below 1 mm height.
B: Foam with 1 mm or more height remained for 10 minutes or more after stirring.
C: Foam with 1 mm or more height remained for 60 minutes or more after stirring.

The polymer slurry was taken out from the reactor and a state of deposition of scales in the reactor was visually observed and evaluated according to the following criteria:
A: Substantially no deposition of scales in the reactor was observed.
B: Deposition of scales which could be easily removed was observed on a baffle and an inner wall of the reactor.
C: A lot of deposition of scales which was difficult to be removed was observed on the baffle and inner wall in the reactor.

Example 2

To a polymerization vessel were added 825 g of vinyl acetate, 800 g of methanol, and 41 g of monomer A which was the same as Example 1, as a modified species, and the system was purged with nitrogen for 30 minutes. Further, a mixed solution of methanol and vinyl acetate (methanol:vinyl acetate=42:58 (mass ratio)) was prepared, and nitrogen purge was carried out by nitrogen gas bubbling. 2.5 g of azobisisobutyronitrile was charged into the polymerization vessel, and a temperature was increased to 60° C. After reflux began, polymerization was carried out at 60° C. while dropping the mixed solution for 8 hours, and after 1 hour from completion of the dropping, the system was cooled to terminate the polymerization. The total addition amount of vinyl acetate was 1500 g, and the total amount of methanol added was 1290 g, until the polymerization was terminated. Unreacted vinyl acetate was then removed by conventional methods, and the resulting polymer was saponified with sodium hydroxide by conventional methods to prepare a dispersion stabilizer. A viscosity average polymerization degree, saponification degree and modification rate of the resulting dispersion stabilizer were measured by the analysis method as described above, indicating that the viscosity average polymerization degree was 520, the saponification degree was 74.2 mol % and the modification rate was 0.25 mol %. Further, suspension polymerization of vinyl chloride was carried out under the same conditions as those of Example 1 with the exception that the resulting dispersion stabilizer was used, and the evaluation was performed.

Example 3

To a polymerization vessel were added 1700 g of vinyl acetate, 1133 g of methanol, and 159.9 g of the monomer A which was the same as Example 1 as a modified species, and the system was purged with nitrogen for 30 minutes. 2.5 g of azobisisobutyronitrile was charged into the polymerization vessel to carry out polymerization at 60° C. for 9 hours, followed by cooling to terminate the polymerization. A dispersion stabilizer was then prepared in the same method as that of Example 1. Suspension polymerization of vinyl chloride was carried out under the same conditions as those of Example 1 with the exception that the resulting dispersion stabilizer was used, and the evaluation was performed.

Example 4

A polymer after removal of unreacted vinyl acetate was obtained in the same method as that of Example 3, and the polymer was then saponified with sodium hydroxide by the conventional methods, with the exception that the amount of sodium hydroxide was increased by 0.4 mmol, to prepare a dispersion stabilizer. A saponification degree of the resulting dispersion stabilizer was 79.0 mol %. Then, suspension polymerization of vinyl chloride was carried out under the same conditions as those of Example 1 with exception that the resulting dispersion stabilizer was used, and the evaluation was performed.

Examples 5 to 6

A dispersion stabilizer was prepared in the same method as that of Example 3 with the exception that the amount of the modified species was changed. Suspension polymerization of vinyl chloride was carried out under the same conditions as those of Example 1 with the exception that the resulting dispersion stabilizer was used, and the evaluation was performed.

Example 7

A dispersion stabilizer was prepared in the same method as that of Example 2 with the exception that the addition amount of methanol added changed to 200 g. Suspension polymerization of vinyl chloride was carried out under the same conditions as those of Example 1 with the exception that the resulting dispersion stabilizer was used, and the evaluation was performed.

Example 8

To a polymerization vessel were added 1700 g of vinyl acetate, 1133 g of methanol, and 82.9 g of polyoxyalkylene alkenyl ether (LATEMUL PD-420 provided by Kao Corporation; hereinafter referred to as "monomer B") represented by the general formula (II) with m=5 to 9 and n=15 to 25 as a modified species, and the system was purged with nitrogen for 30 minutes. 2.5 g of azobisisobutyronitrile was charged into the polymerization vessel to carry out polymerization at 60° C. for 9 hours, followed by cooling to terminate the polymerization. A dispersion stabilizer was then prepared in the same method as that of Example 1. Suspension polymerization of vinyl chloride was carried out under the same conditions as those of Example 1 with the exception that the resulting dispersion stabilizer was used, and the evaluation was performed.

Examples 9 to 10

A dispersion stabilizer was prepared in the same method as that of Example 8 with the exception that the amount of the modified species was changed. Suspension polymerization of vinyl chloride was carried out under the same conditions as those of Example 1 with the exception that the resulting dispersion stabilizer was used, and the evaluation was performed.

Example 11

To a polymerization vessel were added 1700 g of vinyl acetate, 1133 g of methanol, and 109.6 g of polyoxyalkylene alkenyl ether (LATEMUL PD-430 provided by Kao Corporation; hereinafter referred to as "monomer C") represented by the general formula (II) with m=5 to 9 and n=25 to 35 as a modified species, and the system was purged with nitrogen for 30 minutes. 2.5 g of azobisisobutyronitrile was charged into the polymerization vessel to carry out polymerization at 60° C. for 9 hours, followed by cooling to terminate the polymerization. A dispersion stabilizer was then prepared in the same method as that of Example 1. Suspension polymerization of vinyl chloride was carried out under the same conditions as those of Example 1 with the exception that the resulting dispersion stabilizer was used, and the evaluation was performed.

Comparative Examples 1 to 3

A dispersion stabilizer was prepared in the same method as that of Example 1 with the exception that the saponification degree, the modified species and the polymerization degree were changed. Suspension polymerization of vinyl chloride was carried out under the same conditions as those of Example 1 with the exception that the resulting dispersion stabilizer was used, and the evaluation was carried out.

Comparative Example 4

To a polymerization vessel were added 1600 g of vinyl acetate, 605 g of methanol, and 0.7 g of polyoxypropylene acrylate (Blemmer PP 800 provided by NOF CORPORATION; hereinafter referred to as "monomer D") as a modified species, and the system was purged with nitrogen for 30 minutes. Further, the monomer D was dissolved in methanol to prepare a comonomer solution having a concentration of the monomer D of 10% by mass, and nitrogen purge was carried out by nitrogen gas bubbling. 2.5 g of azobisisobutyronitrile was charged into the polymerization vessel and the comonomer solution was dropped to carry out polymerization at 60° C. for 9 hours, followed by cooling to terminate the polymerization. The total addition amount of methanol was 1066 g and the total addition amount of monomer D was 44.6 g, until the polymerization was terminated. A dispersion stabilizer was then prepared in the same method as that of Example 1. Suspension polymerization of vinyl chloride was carried out under the same conditions as those of Example 1 with the exception that the resulting dispersion stabilizer was used, and the evaluation was performed. NMR of the resulting dispersion stabilizer was measured, but the peak derived from the modified species observed in the polyvinyl acetate was not observed in the polyvinyl alcohol.

The results are shown in Table 1. Comparative Example 1 did not use any modified species, so that the vinyl chloride resin particles became coarse, the uniformity of the particle diameter was poor, the absorbability of the plasticizer was poor, and a lot of foaming was generated. Even with the dispersion stabilizers of Comparative Examples 2 and 3 which used the modified species, all of these properties could not be improved. Comparative Example 4 used the modified species similar to the modified species used in Examples but could not improve all of these properties. This would be because the copolymerized modified species was cleaved by saponification. On the contrary, it was found that the use of the dispersion stabilizer according to the present invention resulted in particles with less coarse particles formed in the vinyl chloride resin and having higher particle diameter uniformity. Further, the particles of Examples showed improved absorbability of a plasticizer and less foaming. In addition, Examples provided polymer particles with reduced block formation, reduced deposition of scales during polymerization and improved monomer removal property. Therefore, the dispersion stabilizer according to the present invention is significantly advantageous in terms of industry.

TABLE 1

| | | Example 1 | Example 2 | Example 3 | Example 4 | Example 5 | Example 6 | Example 7 | Example 8 |
|---|---|---|---|---|---|---|---|---|---|
| Used Polyvinyl Alcohol | Modified Species | Polyoxyalkylene alkenyl ether | | | | | | | |
| | Modification rate (mol %) | 0.16 | 0.25 | 0.19 | 0.19 | 0.3 | 0.05 | 0.19 | 0.22 |
| | m | 5~9 | 5~9 | 5~9 | 5~9 | 5~9 | 5~9 | 5~9 | 5~9 |
| | n | 45~55 | 45~55 | 45~55 | 45~55 | 45~55 | 45~55 | 45~55 | 15~25 |
| | Viscosity Average Polymerization Degree | 520 | 520 | 530 | 530 | 440 | 580 | 1200 | 460 |
| | Saponification degree (mol %) | 74.2 | 74.2 | 72.0 | 79.0 | 70.7 | 72.7 | 71.0 | 70.9 |
| Resulting Vinyl Chloride Resin Properties | Average Particle Diameter (μm) | 119 | 114 | 121 | 128 | 115 | 133 | 134 | 126 |
| | Particle Size Distribution (D80-D20) (μm) | 47 | 41 | 48 | 57 | 42 | 59 | 58 | 54 |
| | Plasticizer Absorption Amount (phr) | 34 | 34 | 35 | 30 | 40 | 33 | 25 | 34 |
| | Bulky Specific Gravity (g/mL) | 0.41 | 0.41 | 0.42 | 0.44 | 0.40 | 0.41 | 0.43 | 0.41 |
| | Foaming Property | A | A | A | B | B | A | A | B |
| | Deposition of Scales | A | A | A | B | A | A | B | A |

TABLE 2

| | | Example 9 | Example 10 | Example 11 | Comparative Example 1 | Comparative Example 2 | Comparative Example 3 | Comparative Example 4 |
|---|---|---|---|---|---|---|---|---|
| Used Polyvinyl Alchol | Modified Species | Polyoxyalkylene alkenyl ether | | | None | Dimethyl maleate | Acetaldehyde | Polyoxypropylene acrylate |
| | Modification rate (mol %) | 0.30 | 0.60 | 0.20 | — | 0.60 | 0.20 | 0.00 |
| | m | 5~9 | 5~9 | 5~9 | — | — | — | — |
| | n | 15~25 | 15~25 | 25~35 | — | — | — | — |

TABLE 2-continued

|  |  | Example 9 | Example 10 | Example 11 | Comparative Example 1 | Comparative Example 2 | Comparative Example 3 | Comparative Example 4 |
|---|---|---|---|---|---|---|---|---|
|  | Viscosity Average Polymerization Degree | 940 | 390 | 380 | 600 | 1120 | 630 | 700 |
|  | Saponification degree (mol %) | 72.8 | 71.3 | 73.0 | 72.2 | 72.0 | 71.9 | 71.5 |
| Resulting Vinyl Chloride Resin Properties | Average Particle Diameter (μm) | 133 | 120 | 125 | 200 | 186 | 141 | 199 |
|  | Particle Size Distribution (D80-D20) (μm) | 59 | 46 | 55 | 66 | 77 | 65 | 70 |
|  | Plasticizer Absorption Amount (phr) | 29 | 38 | 35 | 28 | 26 | 30 | 26 |
|  | Bulky Specific Gravity (g/mL) | 0.44 | 0.40 | 0.40 | 0.44 | 0.49 | 0.42 | 0.45 |
|  | Foaming Property | A | B | B | C | B | B | B |
|  | Deposition of Scales | A | A | A | C | B | A | C |

What is claimed is:

1. A modified vinyl alcohol-based polymer having at least one monomer unit represented by the following general formula (I) and a modification rate of from 0.01 mol % to 10 mol %:

general formula (I)

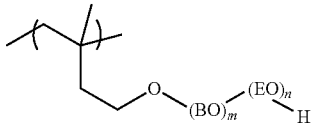

in which BO represents an oxybutylene unit; EO represents an oxyethylene unit; and each of m and n is a number of repeating unit of the respective oxyalkylene units; $1 \leq m \leq 10$; and $1 \leq n \leq 60$.

2. The modified vinyl alcohol-based polymer according to claim 1, wherein the modified vinyl alcohol-based polymer has a viscosity average polymerization degree of from 300 to 5000.

3. The modified vinyl alcohol-based polymer according to claim 1, wherein the modified vinyl alcohol-based polymer has a saponification degree of from 60 mol % to 99.9 mol %.

4. The modified vinyl alcohol-based polymer according to claim 1, wherein the modified vinyl alcohol-based polymer has a viscosity average polymerization degree of 1000 or less.

5. The modified vinyl alcohol-based polymer according to claim 1, wherein the modified vinyl alcohol-based polymer has a saponification degree of from 65 mol % to 80 mol %.

6. A dispersion stabilizer for suspension polymerization, comprising the modified vinyl alcohol-based polymer according to claim 1.

7. A method for producing a vinyl resin, comprising: dispersing a vinyl-based compound monomer or a mixture of the vinyl-based compound monomer and a monomer that is copolymerizable with the vinyl compound monomer in water with the dispersion stabilizer for suspension polymerization according to claim 6, and carrying out suspension polymerization.

* * * * *